(12) United States Patent
Moulin et al.

(10) Patent No.: US 8,182,773 B2
(45) Date of Patent: May 22, 2012

(54) PROCESS FOR SEPARATING A CHEMICAL ELEMENT FROM URANIUM (VI) STARTING FROM A NITRIC AQUEOUS PHASE, IN AN EXTRACTION CYCLE FOR THE URANIUM

(75) Inventors: Jean-Paul Moulin, Bois d' Arcy (FR); Gilbert Andreoletti, Urville-Nacqueville (FR); Patrick Bourdet, Bethesda, MD (US)

(73) Assignee: Areva NC, Paris (FR)

( * ) Notice: Subject to any disclaimer, the term of this patent is extended or adjusted under 35 U.S.C. 154(b) by 249 days.

(21) Appl. No.: 12/307,264

(22) PCT Filed: Jul. 2, 2007

(86) PCT No.: PCT/EP2007/056651
§ 371 (c)(1),
(2), (4) Date: Oct. 10, 2009

(87) PCT Pub. No.: WO2008/003681
PCT Pub. Date: Jan. 10, 2008

(65) Prior Publication Data
US 2010/0034713 A1 Feb. 11, 2010

(30) Foreign Application Priority Data
Jul. 3, 2006 (FR) .................................... 06 52772

(51) Int. Cl.
*C01G 56/00* (2006.01)
(52) U.S. Cl. ................... 423/8; 423/9; 423/10
(58) Field of Classification Search ............ 423/8–10
See application file for complete search history.

(56) References Cited

U.S. PATENT DOCUMENTS

| 4,787,979 A | 11/1988 | Kolarik et al. |
| 2008/0089819 A1 | 4/2008 | Moulin |

FOREIGN PATENT DOCUMENTS

| DE | 2460145 | | 6/1976 |
| FR | 2591910 | A1 | 6/1987 |
| FR | 2880180 | A1 | 6/2006 |
| WO | 9962824 | A1 | 12/1999 |
| WO | 2006/072729 | A1 * | 7/2006 |

OTHER PUBLICATIONS

Germain, M., et al., "Extraction En Milieu Nitrique Du Thorium, Du Neptunium, Du Plutonium, Par Les Solutions De Phosphate De Tributyle Chargees En Uranium", Journal of Inorganic Nuclear Chemistry, 1970, vol. 32, pp. 245-253.
Takanashi, M. et al., "Neptunium concentration profiles in the Purex process", Journal of Alloys and Compounds, vol. 271-273, 1998, pp. 689-692.
Zhaowu, Zhu et al., "Uranium/plutonium and uranium/neptunium separation by the Purex process using hydroxyurea", Journal of Radioanalytical and Nuclear Chemistry, vol. 262, No. 3, 2004, pp. 707-711.
Search Report, FR 06 52772, dated Jan. 31, 2007 (2 pages).
Search Report, PCT/EP2007/056651, dated Oct. 18, 2007.

* cited by examiner

*Primary Examiner* — Steven Bos
(74) *Attorney, Agent, or Firm* — Nixon Peabody LLP

(57) ABSTRACT

A chemical element to be very efficiently separated from uranium starting from an acid aqueous phase, in an extraction cycle for the uranium, when this chemical element is present in said phase at a concentration less than that of the uranium, or even as a trace element, and when it is moreover less extractable by the extractant used in this extraction cycle than is the uranium. The chemical element can notably be neptunium(IV) or thorium 228.

17 Claims, 2 Drawing Sheets

PROCESS FOR SEPARATING A CHEMICAL ELEMENT FROM URANIUM (VI) STARTING FROM A NITRIC AQUEOUS PHASE, IN AN EXTRACTION CYCLE FOR THE URANIUM

CROSS REFERENCE TO RELATED APPLICATIONS or PRIORITY CLAIM

This application is a national phase of International Application No. PCT/EP2007/056651, entitled "METHOD FOR SEPARATING A CHEMICAL ELEMENT FROM URANIUM (VI) USING AN AQUEOUS NITRIC PHASE, IN A URANIUM EXTRACTION CYCLE", which was filed on Jul. 2, 2007, and which claims priority of French Patent Application No. 06 52772, filed Jul. 3, 2006.

TECHNICAL FIELD

The present invention relates to a method for very efficiently separating a chemical element from uranium(VI), starting from a nitric aqueous phase, in an extraction cycle for the uranium, when this chemical element is present in this aqueous phase at a concentration lower than that of the uranium(VI), or even as a trace element, and when it is furthermore less extractable by the extractant used in this extraction cycle than is the uranium(VI) The chemical element can notably be a tetravalent actinide such as neptunium or thorium 228 (which is a decay product of uranium 232), but the method according to the invention may also be applied to the separation of any other chemical element capable of being partially co-extracted with uranium from an acid aqueous phase, in a extraction cycle for the uranium, such as zirconium.

The method according to the invention can notably be implemented in the framework of an operation for reprocessing irradiated nuclear fuels, and in particular in the uranium purification cycle known as the "second uranium cycle" of the PUREX process or any other process derived from the latter, either with the objective of facilitating the decontamination of the uranium with regard to a pollutant such as neptunium, or with the objective of recuperating a chemical element which is present as a trace element in the uranium-concentrated aqueous stream, coming from the first purification cycle of this process, and which is likely to be of value—which is notably the case for thorium 228—the two objectives not, furthermore, being mutually exclusive.

PRIOR ART

In modern plants for reprocessing spent nuclear fuels, such as the COGEMA UP3 and UP2-800 in France, Thorp in the United Kingdom or Rokkasho in Japan, the reprocessing of the spent nuclear fuels is based on the PUREX process and comprises several purification cycles.

The first purification cycle aims to jointly separate uranium and plutonium from the fission products, then to perform a partition of these two elements into two streams.

Thus, this first cycle begins with an operation consisting in co-extracting uranium and plutonium, the first in the oxidation state VI, the second in the oxidation state IV, from a nitric aqueous phase which results from the dissolution of a spent nuclear fuel in nitric acid and which is accordingly referred to as dissolution liquor.

This co-extraction is carried out by means of a water immiscible organic phase, which is composed of an extractant having a high affinity for uranium(VI) and plutonium(IV), in this case tri-n-butyl phosphate (hereinafter TBP), generally a 30% solution by volume in an organic dilutant, generally a hydrocarbon such as hydrogenated tetrapropylene (hereinafter TPH), n-dodecane or 'odorless kerosene'. It additionally comprises a washing stage for the organic phase carried out by a nitric aqueous solution which is designed to improve the decontamination of the uranium and plutonium with regard to the fission products.

The uranium and plutonium partition operation is subsequently carried out. This is based on a voluntary alteration of the oxidation state of the plutonium(IV) which is brought to the trivalent state, where its extractability by the TBP is minimal, in order to favor its passage into a nitric aqueous solution and to thus separate it from the uranium(VI) which itself remains in the organic phase. This reduction is carried out using a reducing agent, uranous nitrate, and an anti-nitrous agent, hydrazine, whose role is to stabilize both the uranous nitrate and the plutonium(III) by destruction of the nitrous acid.

The neptunium present in the dissolution liquor is co-extracted, mainly in the form of neptunium(VI), with the uranium and the plutonium. Similarly, the thorium 228, which only exists in aqueous solution in the tetravalent state, is partially co-extracted with the uranium and the plutonium (Germain et al., Journal of Inorganic Nuclear Chemistry, 1970, vol. 32, pp 245-253).

During the partition operation, the neptunium(VI) is reduced by the uranous nitrate into neptunium(IV), in which state it is extractable by the TBP, however less so than in the oxidation state VI. It therefore remains in the organic phase with the uranium, as does a large part of the thorium(IV).

After the partition operation, the uranium(VI) is stripped from the organic phase by means of a nitric aqueous solution and the tetravalent actinides which have followed it during the preceding operations (neptunium(IV), plutonium(IV) and thorium(IV), the two latter elements being present as trace elements) are stripped with it.

The aqueous effluent coming from the stripping of the uranium, following an inter-cycle concentration operation, then undergoes a second purification cycle referred to as "second uranium cycle" in order to decontaminate the uranium with regard to neptunium. The latter is eliminated by an adjustment to the oxidation state V where it is inextractable by the TBP.

This adjustment is more difficult to perform than the operation which consists in adjusting the neptunium to the oxidation state IV and in eliminating the latter thanks to a saturation of the organic phase with uranium(VI), which would be possible since the risk of criticality will have been eliminated owing to the elimination of the major part of the plutonium in the partition step. Calculations, confirmed by pilot tests, show that this configuration however implies, in the part of the extractor situated immediately in the vicinity of the extraction front of the uranium, an accumulation of nitric acid so as to favor the formation of a peak of neptunium(IV).

This configuration, on the one hand, renders the system extremely sensitive even to the smallest variations in the saturation of the organic phase with uranium(VI) and, on the other, makes stopping the cycle very difficult without contamination of the fraction of the uranium processed at the end of the operation.

Furthermore, the elimination of thorium 228, although facilitated with respect to that of neptunium(IV) owing to the lower extractability of the tetravalent thorium by the TBP, nevertheless remains limited for the same reason, namely the formation of a peak of thorium upstream, relative to the direction of flow of the organic phase in the extractor, of the extraction front of the uranium.

The Inventors therefore fixed themselves the goal of providing a process that allows, in a cycle for extraction of the uranium such as that applied in the "second uranium cycle" of the PUREX process, a chemical element to be very efficiently separated from uranium(VI) starting from a nitric aqueous phase when this chemical element is present in this aqueous phase at a concentration lower than that of the uranium(VI), or even as a trace element, and when it is furthermore less extractable by the extractant chosen for carrying out this extraction cycle than is the uranium(VI).

The Inventors moreover fixed themselves the goal of providing a process that allows the chemical element to be recovered in a concentrated and purified form for the case where this element is of value.

BRIEF SUMMARY OF THE INVENTION

This goal, and others, are achieved by a process for separating a chemical element from uranium(VI), starting from a nitric aqueous phase A1, in an extraction cycle for the uranium comprising:

a) a uranium(VI) extraction step, in which an aqueous phase flows, with a flow rate $D_1$, in a first extractor (10), in counter-flow to an organic phase, immiscible with water and containing an extractant, and b) a step for washing the organic phase obtained after the step a) with a nitric aqueous phase A2, in which the organic phase flows in a second extractor (11) in counter-flow to the phase A2;

in which the first and second extractors are connected to one another in such a manner that the aqueous phase flowing in the first extractor is formed by the phase A1 and by the phase A2 obtained after the step b); and in which, since the chemical element is present in the phase A1 at a concentration lower than that of the uranium(VI) and is less extractable by said extractant than is the uranium(VI), it accumulates in the organic phase in the course of the step a);

said process being characterized in that the step a) comprises the drawing-off of a part of the aqueous phase flowing in the first extractor, at the accumulation peak of the chemical element in the organic phase, or else upstream (relative to the direction of flow of the organic phase) of this peak.

According to the invention, the exact position of the draw-off in the first extractor is chosen depending on the main objective sought.

Thus, a draw-off upstream of the accumulation peak of the chemical element in the organic phase will allow an improved decontamination of the uranium with regard to this chemical element to be obtained and vice versa, and will therefore be favored in the case where it is sought essentially to decontaminate the uranium with regard to a pollutant, whereas a draw-off at the accumulation peak of the chemical element in the organic phase will allow a maximum concentration of the chemical element in the drawn-off part of the aqueous phase to be obtained but at the expense of a greater contamination of this element by the uranium, and will therefore be favored in the case where it is sought essentially to recover this element with a view to its exploitation.

Wherever the position of the draw-off, it is preferred that the accumulation peak of the chemical element in the organic phase be very pronounced, or at least as visible as possible.

Accordingly, the operating conditions in the steps a) and b) are preferably chosen in such a manner as to obtain:

on the one hand, a very high extraction of the uranium during the step a) and, similarly, a saturation in uranium of the organic phase prior to it leaving the first extractor; and on the other, an extraction factor for the chemical element greater than 1, and preferably much greater than 1, in the part of the first extractor situated upstream (relative to the direction of flow of the organic phase) of the extraction front of the uranium, but less than 1, and preferably much less than 1, in the second extractor and also in the part of the first extractor closest to its aqueous phase supply.

Thus, for example, in the case where the chemical element to be separated from the uranium is thorium 228 and where it was chosen to use tri-n-butyl phosphate with 30% v/v in an organic dilutant as organic phase, these criteria will be satisfied, as is shown by the experimental results reported by Germain et al. (ibid) keeping:

in the part of the first extractor situated upstream of the extraction front of the uranium: a nitric acid concentration greater than 2 moles/L for a ratio of organic phase/ aqueous phase flow rates of around 3 in the first extractor;

in the second extractor and in the part of the first extractor closest to the aqueous phase supply of the latter: a nitric acid concentration equal to or less than 2 moles/L for a ratio of organic phase/aqueous phase flow rates of around 6 in the second extractor.

This is equally applicable to other chemical species which have a behavior analogous to that of thorium 228 such as, for example, neptunium(IV).

Furthermore, it is desirable that the flow rate $D_2$ of the draw-off represents a fraction of the flow rate $D_1$ such that the product of the concentration of the chemical element in the aqueous phase at the moment of the draw-off and the flow rate $D_2$ is equal to the flow of this element entering the first extractor, in such a manner that the inlet and outlet flows of said element are balanced.

In the case where it is desired to recover the chemical element with a view to its exploitation, then the process according to the invention additionally comprises one or more steps for concentration and purification of the chemical element present in the drawn-off part of the aqueous phase.

Thus, in a first preferred embodiment of the process according to the invention, the latter comprises a step $c_1$) for extraction of the uranium present in the drawn-off part of aqueous phase, by means of an organic phase of the same composition as that used in the step a), coupled with a step $d_1$) for washing of this organic phase with a nitric aqueous phase A3.

According to the invention, the step $c_1$) is advantageously carried out by adding the drawn-off part of the aqueous phase to the phase A3 obtained after the step $d_1$) and by making the resulting aqueous stream flow in a third extractor, in counter-flow to the organic phase.

Thus, by drawing-off a part of this aqueous stream during the step $c_1$), while returning the rest of this stream, at the outlet of the extractor, toward the first extractor, the chemical element may be recovered in a concentrated and purified form without generating additional effluents with respect to those produced during the steps a) and b).

In another preferred embodiment of the process according to the invention, which is particularly well adapted to the case where the chemical element is present as a trace element in the phase A1, this process comprises a step $c_2$) consisting in subjecting the drawn-off part of the aqueous phase to one or more chromatographies on a stationary solid phase in order to concentrate and purify the chemical element present in this phase.

Preferably, the stationary solid phase is an ion exchanger resin.

According to the invention, the extractant present in the organic phases used in the steps can be any molecule known for exhibiting a particular affinity with regard to uranium. However, a tri-alkyl phosphate is preferably used, and, in particular, tri-n-butyl phosphate, which is the extractant in the PUREX process. In which case, the latter is preferably used with 30% v/v in an organic dilutant, advantageously a linear or branched dodecane, such as n-dodecane or hydrogenated tetrapropylene.

The phase A1 is preferably a nitric aqueous phase with high acidity, with a nitric acid concentration of around 4 to 6 mol/L, in which case the nitric aqueous phases used for the washing operations (phases A2 and A3) have a low acidity, for example with a nitric acid concentration less than or equal to 2 mol/L.

The process according to the invention presents numerous advantages, namely:
   that of enabling a very efficient decontamination of the uranium(VI) with regard to the chemical element and vice versa;
   that of also enabling a very efficient decontamination of the chemical element with regard to the pollutants that are inextractable from the uranium(VI);
   that of enabling concentration and purification of the chemical element, if it is desired to recover this element.

Furthermore, when applied in an extraction cycle for uranium, upon stopping the cycle, the process according to the invention avoids pollution of the uranium by the chemical element occurring: to achieve this, the step a) just needs to be carried out by supplying the first extractor with decontaminated uranium while continuing to draw off a part of the aqueous phase flowing in this extractor in order to resorb the accumulation of the chemical element without polluting the latest batch of uranium.

According to the invention, the chemical element is preferably a tetravalent actinide chosen from between neptunium and thorium 228.

Another subject of the invention is a reprocessing operation for spent nuclear fuel, which is characterized in that it implements a separation process such as previously defined.

Yet another subject of the invention is a purification cycle for the uranium from a PUREX process, which is characterized in that it comprises the implementation of a separation process such as previously defined, in which case the chemical element to be separated from the uranium(VI) is preferably a tetravalent actinide chosen from between neptunium and thorium 228.

The invention will be better understood upon reading the description complement that follows and which refers to the appended figures.

It goes without saying that this description complement is only given by way of illustration of the subject of the invention and does not in any way constitute a limitation of this subject.

BRIEF DESCRIPTION OF THE DRAWINGS

FIG. 1A corresponds to a schematic diagram of an extraction cycle such as is capable of being implemented for decontaminating the uranium(VI) present in a nitric aqueous phase with regard to a chemical element, less extractable than the uranium, for example in the framework of the "second uranium cycle" of a PUREX process;

FIG. 1B shows the profiles of concentration $[C_{org}]$ of the uranium(VI) (curve A) and of the chemical element (curve B) in the organic phase, together with the profile of acidity (curve C) of this phase, in the course of the extraction cycle illustrated in FIG. 1A;

FIG. 2 illustrates schematically an example of the first preferred embodiment of the process according to the invention; whereas

In FIGS. 1A, 2 and 3, the extractors are symbolized by rectangles, the organic phase streams are symbolized by a double line and this phase is more simply denoted "solvent", whereas the aqueous streams are symbolized by a single line.

The operations for washing the aqueous phases by an organic phase have purposely not been shown for the sake of simplification of the figures.

DETAILED DESCRIPTION OF THE INVENTION

Figure 1A:
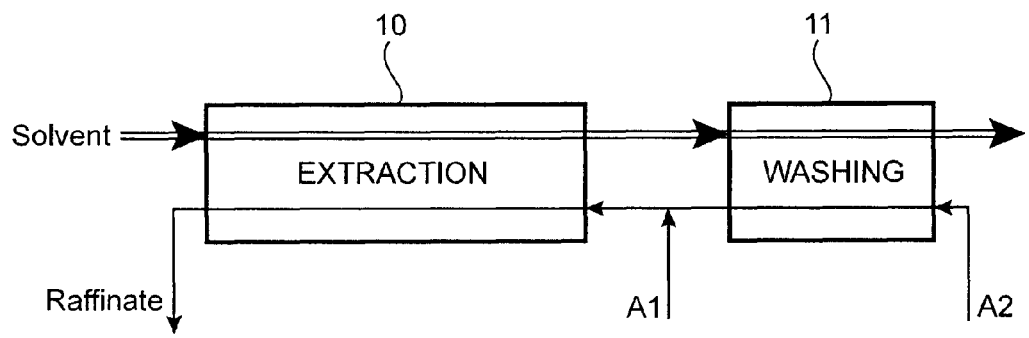
FIGS. 1A and 1B are intended to facilitate the understanding of the invention, whereas FIGS. 2 and 3 relate to exemplary embodiments of the process according to the invention. Thus.

Reference is first of all made to FIG. 1A which shows schematically an extraction cycle such as is capable of being implemented for decontaminating the uranium(VI) present in a nitric aqueous phase, denoted phase A1, with regard to a chemical element, denoted element E, less extractable than the uranium, for example in the framework of the "second uranium cycle" of a PUREX process.

In this phase A1, the uranium(VI) is present in a high concentration, for example of around 400 g/L, whereas the element E, which is for example neptunium(IV) or thorium 228 (which is also tetravalent), is present at a much lower concentration, for example of around 1% or less than that of the uranium, or else as a trace element.

With regard to the concentration of nitric acid in the phase A1, this is, for example, from 4 to 6 moles/L.

In this example, the extraction cycle comprises:
   an extraction step per se, whose aim is to extract the uranium(VI) from the phase A1 by means of an organic phase, immiscible with water and containing an extractant capable of extracting the uranium and, to a lesser degree, the element E, and
   a step for washing the organic phase with a nitric aqueous phase (hereinafter denoted phase A2), whose purpose is to strip from the organic phase the fraction of element E having been extracted with the uranium(VI) in the preceding step.

The organic phase is, for example, composed of tri-n-butyl phosphate with 30% v/v in a dodecane, whereas the phase A2 is, for example, an aqueous solution with acidity less than 2 moles/L of $HNO_3$, for example of around 1 mole/L.

As can be seen in FIG. 1A, these extraction and washing steps are carried out in two different extractors, 10 and 11 respectively, which are preferably multistage extractors (of the mixer-decanter or pulsed-column type), which are connected together and in which the solvent and aqueous phases are set to flow in the counter-flow direction.

The extractor 10 is therefore supplied:
   at one of its ends, by a fresh stream of organic phase, and
   at the other of its ends, by an aqueous stream formed by the phase A2 having been used to wash the organic phase in the extractor 11 to which the phase A1 is added; whereas the extractor 11 is supplied:
   at one of its ends, by the organic phase having been used to extract the uranium in the extractor 10, and
   at the other of its ends, by a fresh stream of phase A2.

Figure 1B:
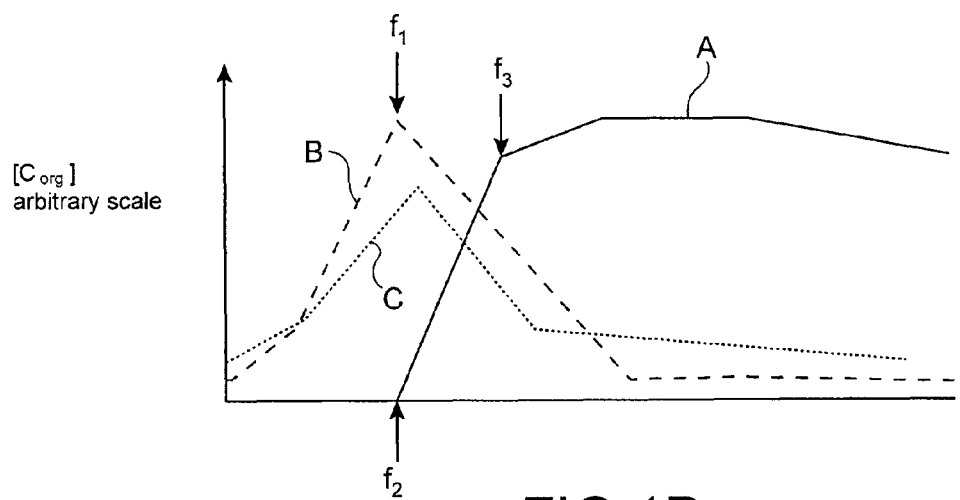

Reference is now made to FIG. 1B which shows the profiles of concentration [$C_{org}$] of uranium (curve A) and of the element E (curve B) in the organic phase, together with the profile of acidity (curve C) of this phase, over the whole of its travel in the extractors 10 and This figure shows that there occurs, in the part of the extractor 10 situated upstream (in the direction of circulation of the organic phase) of the extraction front of the uranium—which corresponds to the segment of the curve A included between the arrows $f_2$ and $f_3$—, an accumulation of nitric acid in the organic phase that favors the passage of the element E in the organic phase and the formation of an accumulation peak of this element in this organic phase (and, in an inseparable manner, also in the aqueous phase).

The existence of this accumulation peak of the element E opposes efficient separation of the uranium and this element and, therefore, the possibility of satisfactorily decontaminating the uranium with regard to the element E and, in a reciprocal manner, the element E with regard to uranium.

For this reason, the invention proposes that a part of the aqueous phase flowing in the extractor 10 be drawn off, at the accumulation peak of the element E in the organic phase or before this peak occurs, in other words, in the configuration illustrated in FIG. 1B, in the part of the reactor 10 situated at the arrow $f_1$ or upstream (relative to the direction of flow of the organic phase) of this arrow.

As previously indicated, the exact position of the draw-off is chosen depending on the parameter that it is desired to favor.

Thus, a draw-off at the accumulation peak of the chemical element in the organic phase will allow a maximum concentration of the chemical element to be obtained in the drawn-off part of the aqueous phase but at the expense of a relatively high contamination of this element with uranium, whereas a draw-off upstream of this peak will allow an improved decontamination of the uranium with regard to the uranium and vice versa, but at the expense of a lower concentration of the element E in the drawn-off part of the aqueous phase.

Figure 2:
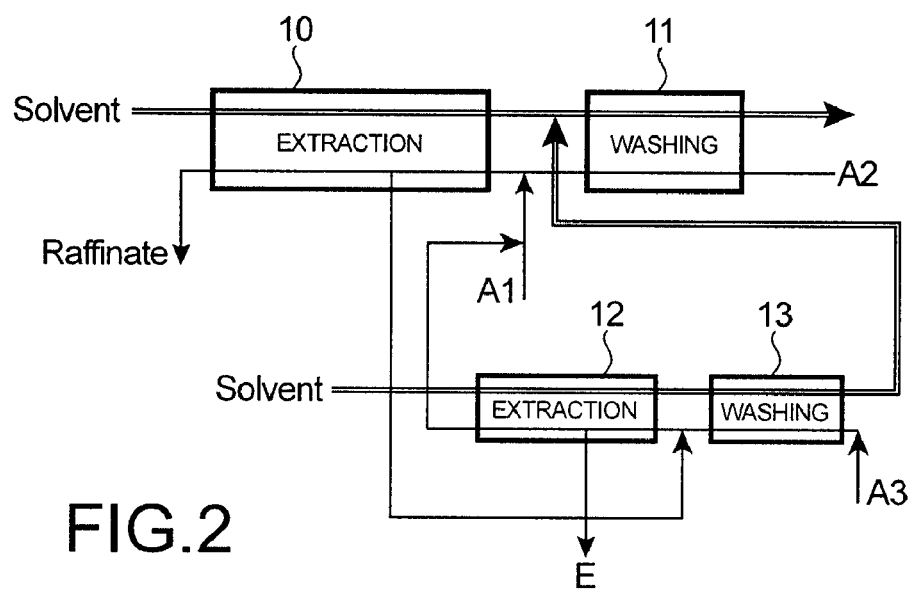

Reference is now made to FIG. 2 which illustrates schematically an example of the first preferred embodiment of the process according to the invention, in which the part of the aqueous phase drawn off in the extractor 10 is subjected to a complementary extraction cycle in order to concentrate and purify the element E.

The process according to the invention therefore comprises two extraction cycles, coupled to one another, namely:
a first cycle, which is identical to that illustrated in FIG. 1A, with the difference that a part of the aqueous phase flowing in the extractor 10 is drawn off at the accumulation peak of the element E in the organic phase or upstream (relative to the direction of flow of the organic phase) of this peak, and
a second cycle, which comprises:
the extraction step per se whose aim is to extract the uranium(VI) present in the drawn-off part of the aqueous phase in the extractor 10 from this part of the aqueous phase, by means of an organic phase which is advantageously of the same composition as that used in the first extraction cycle (TBP with 30% v/v in an organic diluant), and
a step for washing the organic phase with a nitric aqueous phase (hereinafter denoted phase A3), for example an aqueous solution with acidity less than 2 moles/L of $HNO_3$, whose purpose is to strip from the organic phase the fraction of element E having been extracted with the uranium(VI) in the preceding step.

As can be seen in FIG. 2, the extraction and washing steps of this second cycle are carried out, like those of the first cycle, in two different extractors, 12 and 13 respectively, which are connected together and in which les solvent and aqueous phases are set to flow in counter-flow.

Thus, the extractor 12 is supplied:
at one of its ends, by a fresh stream of organic phase, and
at the other of its ends, by an aqueous stream formed by the phase A3 having been used to wash the organic phase in the extractor 13, to which is added the drawn-off part of the aqueous phase in the extractor 10; whereas the extractor 13 is supplied:
at one of its ends, by the organic phase having been used to extract the uranium in the extractor 12, and
at the other of its ends, by a fresh stream of phase A3.

By drawing off a fraction of the aqueous phase flowing in the extractor 12 while at the same time sending, on the one hand, the rest of this aqueous phase, once output from this extractor, to be combined with the phase A1 before the latter is added to the phase A2, and, on the other, the organic phase coming from the extractor 13 to be combined with the organic phase coming from the extractor 10 before the latter enters the extractor 11, it is possible to make the second extraction cycle operate by feedback control onto the first and to recover, in the fraction of aqueous phase drawn off in the extractor 12, the element E, both concentrated and purified, without generating additional effluents with respect to those produced in the first extraction cycle.

Figure 3:
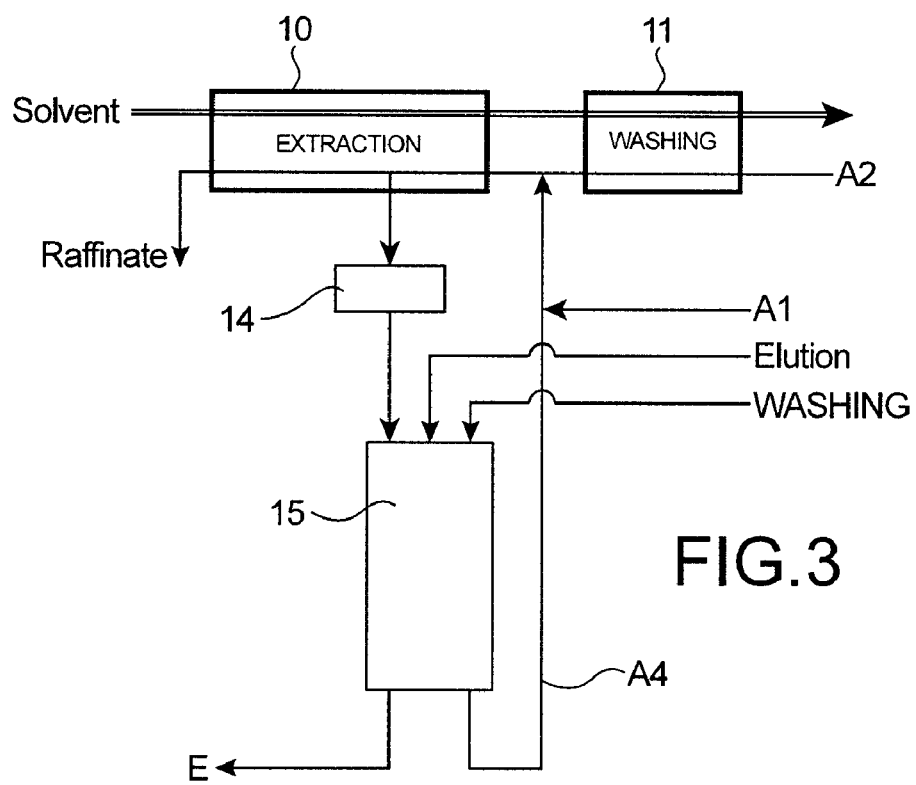
FIG. 3 illustrates schematically an example of the second preferred embodiment of the process according to the invention.

Reference is now made to FIG. 3 which illustrates schematically an example of the second preferred embodiment of the process according to the invention, in which the drawn-off part of the aqueous phase in the extractor 10 is subject to complementary chromatography operations on ion exchange resin in order to concentrate and purify the element E that it contains, and which is particularly well adapted to the case where the element E appears as a trace element in the phase A1.

In this example, the process comprises, first of all, an extraction cycle which is identical to that illustrated in FIG. 1A, with the difference that a part of the aqueous phase flowing in the extractor 10 is drawn off at the accumulation peak of the element E in the organic phase or upstream (relative to the direction of flow of the organic phase) of this peak.

Then, the fraction of aqueous phase drawn off is fed into a buffer tank 14 where it is stored before being routed toward a column 15 filled with an ion exchange resin.

The elution, then the washing of the resin with nitric aqueous phases allows fractions rich in the element E and fractions rich in uranium(VI) to be recovered at the outlet of the column. The latter, which are referenced A4 in FIG. 3, are sent to be combined with the phase A1 before this is added to the phase A2.

The invention claimed is:
1. A process for separating a chemical element from uranium(VI) starting from a nitric acid aqueous phase A1, in an extraction cycle for the uranium comprising:
a) a uranium(VI) extraction step, in which an aqueous phase flows, with a flow rate $D_1$, in a first extractor, in counter-flow to an organic phase, immiscible with water and containing an extractant, and
b) a step for washing the organic phase obtained after step a) with a nitric acid aqueous phase A2, in which the organic phase flows in a second extractor in counter-flow to nitric acid aqueous phase A2;
in which the first and second extractors are connected to one another in such a manner that the aqueous phase flowing in the first extractor is formed by nitric acid aqueous phase A1 and by nitric acid aqueous phase A2 obtained after step b); and in which the chemical element is present in nitric acid aqueous phase A1 at a concentration lower than that of the uranium(VI) and is less extractable by said extractant than is the uranium(VI), and the chemical element accumulates in the organic phase in the course of step a);

said process being characterized in that step a) comprises drawing-off a part of the aqueous phase flowing in the first extractor, at the accumulation peak of the chemical element in the organic phase, or upstream, relative to the direction of flow of the organic phase, of said accumulation peak.

2. The process as claimed in claim 1, in which flow rate $D_2$ of the draw-off represents a fraction of flow rate $D_1$ such that the product of the concentration of the chemical element in aqueous phase flowing in the first extractor, when the draw-off occurs, and flow rate $D_2$ is equal to the flow of the chemical element entering the first extractor.

3. The process as claimed in claim 1, which further comprises one or more steps for concentration and purification of the chemical element present in the drawn-off part of the aqueous phase.

4. The process as claimed in claim 3, which comprises a step $c_1$) for extraction of the uranium present in the drawn-off part of aqueous phase, by means of an organic phase of the same composition as that in step a), coupled with a step $d_1$) for washing the organic phase with a nitric acid aqueous phase A3.

5. The process as claimed in claim 4, in which step $c_1$) is carried out by adding the drawn-off part of the aqueous phase to nitric acid aqueous phase A3 obtained after step $d_1$) and by making the resulting aqueous stream flow in a third extractor, in counter-flow to the organic phase.

6. The process as claimed in claim 5, in which step $c_1$) comprises drawing-off a part of the aqueous stream flowing in the third extractor and returning the other part toward the first extractor.

7. The process as claimed in claim 3, which comprises a step $c_2$) consisting in subjecting the drawn-off part of the aqueous phase to one or more chromatographies on a stationary solid phase.

8. The process as claimed in claim 7, in which the stationary solid phase is an ion exchange resin.

9. The process as claimed in claim 1, in which the extractant is tri-n-butyl phosphate which is employed with 30% v/v in an organic dilutant.

10. The process as claimed in claim 9, in which nitric acid aqueous phase A1 exhibits a molarity of from 4 to 6 M.

11. The process as claimed in claim 9, in which nitric acid aqueous phase A2 exhibits a molarity less than or equal to 2 M.

12. The process as claimed in claim 4, in which the extractant is tri-n-butyl phosphate which is employed with 30% v/v in an organic dilutant.

13. The process as claimed in claim 12, in which nitric acid aqueous phase A3 exhibits a molarity less than or equal to 2 M.

14. The process as claimed in claim 1, in which the chemical element is a tetravalent actinide chosen from the group consisting of neptunium and thorium 228.

15. The process as claimed in claim 1, wherein the Uranium(VI) is at least part of a spent nuclear fuel.

16. A purification cycle comprising the step of obtaining uranium from a PUREX process, which further comprises the separation process as claimed in claim 1.

17. The purification cycle as claimed in claim 16, in which the separation process is used for separating a tetravalent actinide chosen from the group consisting of neptunium and thorium from uranium(VI).

* * * * *